(12) United States Patent
Mönch

(10) Patent No.: US 6,304,745 B1
(45) Date of Patent: Oct. 16, 2001

(54) METHOD OF ESTABLISHING A RADIO CHAIN IN A RADIOCOMMUNICATIONS NETWORK

(75) Inventor: Egon Mönch, Remchingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/062,054

(22) Filed: Apr. 17, 1998

(30) Foreign Application Priority Data

Apr. 18, 1997 (DE) ............................................... 197 16 433

(51) Int. Cl.⁷ ...................................................... H04B 7/185
(52) U.S. Cl. ........................................... 455/13.1; 455/445
(58) Field of Search .................................. 455/7, 8, 9, 10, 455/445, 13.1, 431, 11.1, 455

(56) References Cited

U.S. PATENT DOCUMENTS

| | | | |
|---|---|---|---|
| 4,999,833 | * 3/1991 | Lee | 370/94.1 |
| 5,034,993 | * 7/1991 | Sasuta | 455/11 |
| 5,133,001 | 7/1992 | Bohm . | |
| 5,392,449 | * 2/1995 | Shaughnessy | 455/8 |
| 5,708,962 | * 1/1998 | Macintyre | 455/8 |
| 5,784,684 | * 7/1998 | Van Wageningen | 455/9 |
| 5,850,592 | * 12/1998 | Ramanthan | 455/7 |
| 5,963,943 | * 10/1999 | Cummins | 707/10 |
| 5,966,658 | * 10/1999 | Kennedy | 455/426 |
| 6,055,429 | * 4/2000 | Lynch | 455/445 |

FOREIGN PATENT DOCUMENTS

| | | |
|---|---|---|
| 3908940 | 9/1990 | (DE) . |
| 4033107 | 11/1991 | (DE) . |
| 19518754 | 12/1995 | (DE) . |
| 4432926 | 3/1996 | (DE) . |
| 0687077 | 12/1995 | (EP) . |

\* cited by examiner

*Primary Examiner*—Daniel Hunter
*Assistant Examiner*—Nick Corsaro
(74) *Attorney, Agent, or Firm*—Ware, Fressola, Van Der Sluys & Adolphson LLP

(57) ABSTRACT

A method of establishing a radio chain between a calling radio station and a called radio station in a radiocommunications network, including first steps (110 to 140) in which a list (L) is created for the calling radio station (2) containing information (S=2, R=4; 6) on radio links to neighboring stations (4, 6), and also including steps (151 to 160) in which the list (L, L', L") is extended step by step by adding information (S=6, R=7; 8; 9) on radio links to the radio stations (7; 8; 9) adjacent to the neighboring radio stations (6) until information (S=8; R=1) on a radio link leading to the called radio station (1) is entered in the list (L"). The list (L") contains no superfluous information, but only information required to establish the shortest possible radio chain. Also disclosed are a corresponding radio station and a radiocommunications network, which can be a single-channel system. The invention can be used in the field of wireless office communication.

9 Claims, 3 Drawing Sheets

Figure 1:
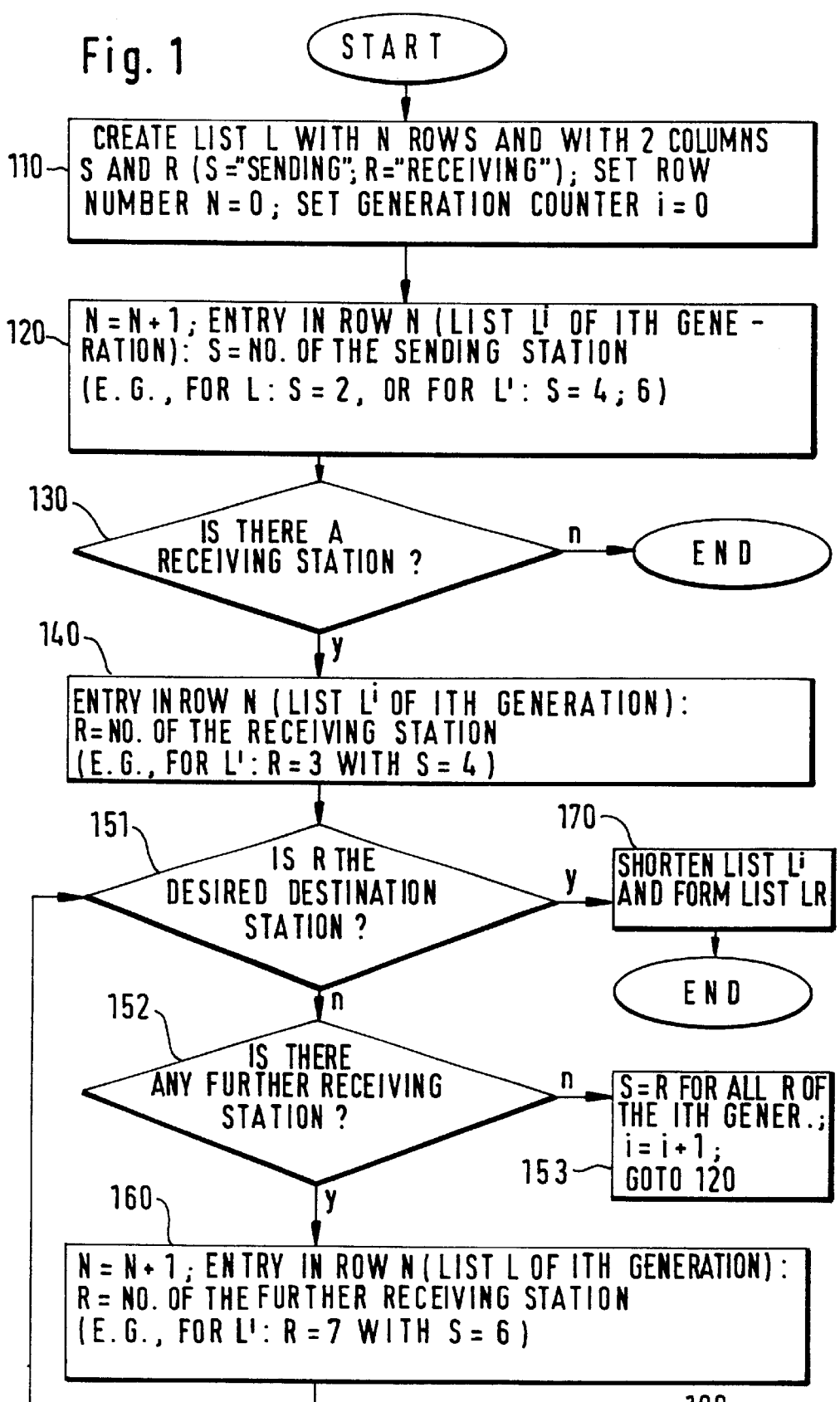

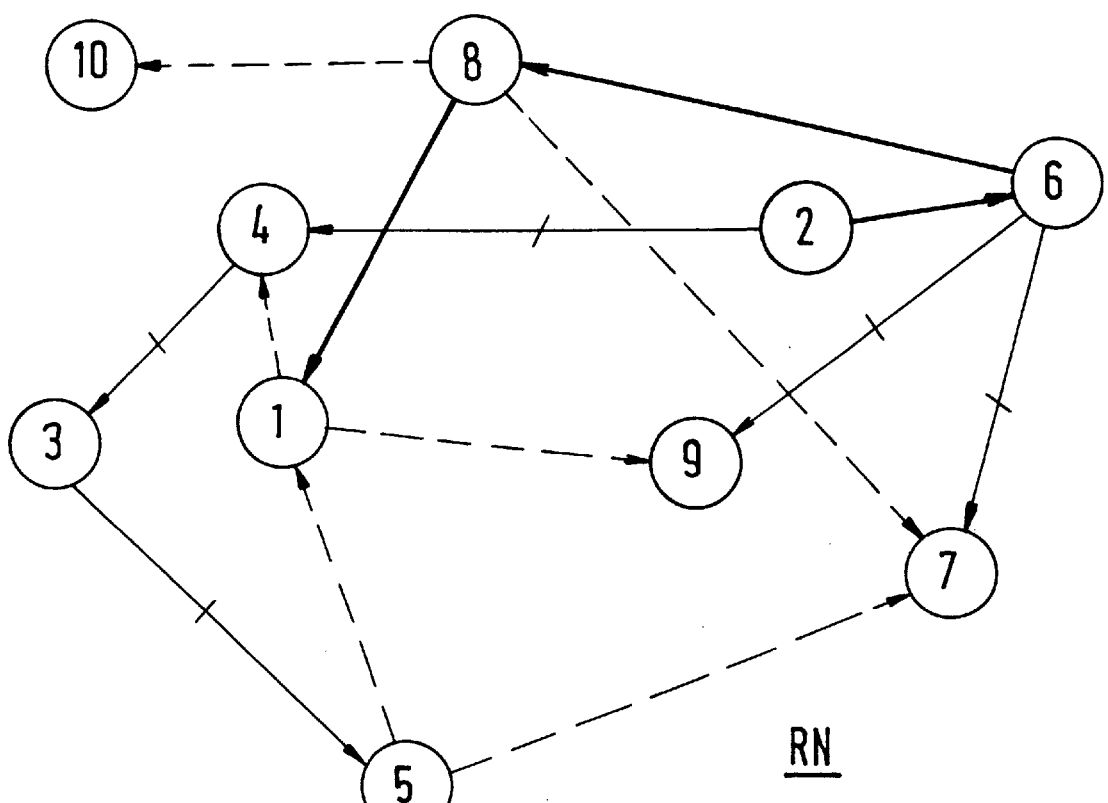
Fig.2a  RN
Fig.2b  RC

METHOD OF ESTABLISHING A RADIO CHAIN IN A RADIOCOMMUNICATIONS NETWORK

TECHNICAL FIELD

This invention relates to a method of establishing a radio chain consisting of at least two radio links, between a calling radio station and a called radio station in a radiocommunications network, having first steps in which a list is created for the calling radio station information on radio links to neighboring radio stations.

It is also directed to a radiocommunications network comprising a number of radio stations wherein, to establish a radio chain consisting of at least two radio links to a called radio station, a calling radio station accesses a memory which holds a list for the calling radio station containing information on radio links to neighboring radio stations.

It is still further directed to a radio station for a radiocommunications network comprising a number of radio stations which is a called radio station and which, to establish a radio chain consisting of at least two radio links to a called radio station, accesses a memory which holds a list for the calling radio station containing information on radio links to neighboring radio stations.

BACKGROUND OF THE INVENTION

A method of establishing a radio chain in a radiocommunications network is known from DE 39 08 940 A1. The radio chain contains a number of radio stations, each of which has at least one neighboring station with which it is in direct radio communication. Several pairs of channels are available for duplex radio transmissions between the stations. Prior to the establishment of a radio chain with at least two radio links, the calling station checks all channels to see whether they are free, and creates a so-called channel occupancy list. This list contains information on radio links to the neighboring stations, namely the numbers of the free channels on which radio links can be established to the neighboring stations. To establish a radio link to a called station, the calling station, besides having its own channel occupancy list, also receives the channel occupancy lists of those neighboring stations which serve as relay stations in the radio chain. In the known radiocommunications network, the calling station must evaluate all channel occupancy lists to be able to establish a radio chain. The evaluation of the lists is not described in DE 39 08 940 A1. In addition, each station must have a scanning receiver to be able to determine which channels are free for the establishment of the radio chain. The known method can only be carried out in a multichannel radiocommunications network.

SUMMARY OF THE INVENTION

It is an object of the invention to provide a method of establishing a radio chain which can be carried out by radio stations of simple construction. Moreover, a radio station suitable for carrying out the method and a radiocommunications network with such a radio station are to be provided.

The object is attained by a method of establishing a radio chain, consisting of at least two radio links, between a calling radio station and a called radio station in a radiocommunications network, having first steps in which a list is created for the calling radio station containing information on radio links to neighboring radio stations, further having steps in which the list is extended step by step by adding information on radio links to the radio stations adjacent to the neighboring radio stations until information is entered in the list on a radio link which leads to the called radio station.

The object is also attained by a radiocommunications network comprising a number of radio stations wherein, to establish a radio chain consisting of at least two radio links to a called radio station, a calling radio station accesses a memory which holds a list for the calling radio station containing information on radio links to neighboring radio stations, wherein the memory also contains information on radio links to radio stations adjacent to the neighboring radio stations, by addition of which information the list is extended step by step up to and including the information on a radio link which leads to the called radio station.

The object is still further attained by a radio station for a radiocommunications network comprising a number of radio stations which is a called radio station and which, to establish a radio chain consisting of at least two radio links to a called radio station, accesses a memory which holds a list for the calling radio station containing information on radio links to neighboring radio stations, wherein the memory also contains information on radio links to radio stations adjacent to the neighboring radio stations, by addition of which information the list is extended step by step up to and including the information on a radio link which leads to the called radio station.

According to the invention, to establish a radio chain consisting of at least two radio links, the list created for the calling radio station, which already contains information on radio links to neighboring radio stations, is extended step by step by adding information on radio links to radio stations adjacent to the neighboring radio stations until information is entered in the list on a radio link which leads to the called radio station.

In this manner, the calling station needs to access only one list to obtain all information required to establish the radio chain. The list created by the method according to the invention contains no superfluous information on those radio links which could not be part of the radio chain. The method works alike in all radio stations. The radio station according to the invention requires no scanning receiver. The radiocommunications system can also be a single-channel system. The method according to the invention can be carried out both in a decentralized radiocommunications network and in a centralized network.

According to one dependent claim, it is particularly advantageous to form from the extended list a shortened list which only contains information for a short radio chain with as few radio links as possible.

Further advantageous features of the invention are defined in the other dependent claims.

Figure 3A:
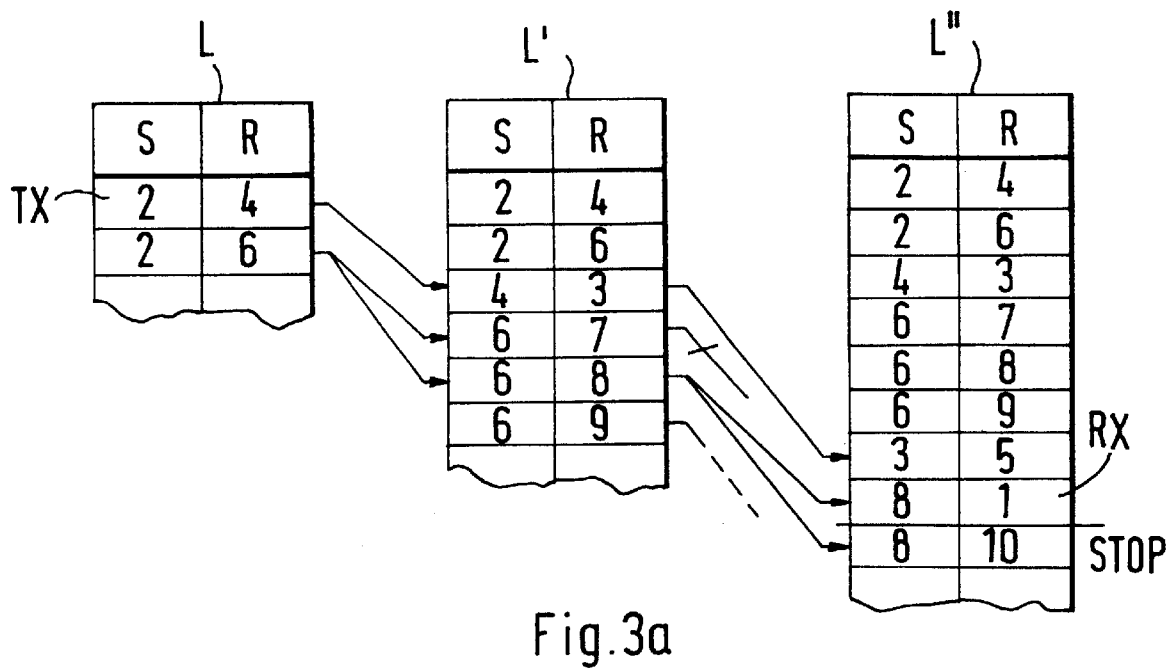
Figure 3B:
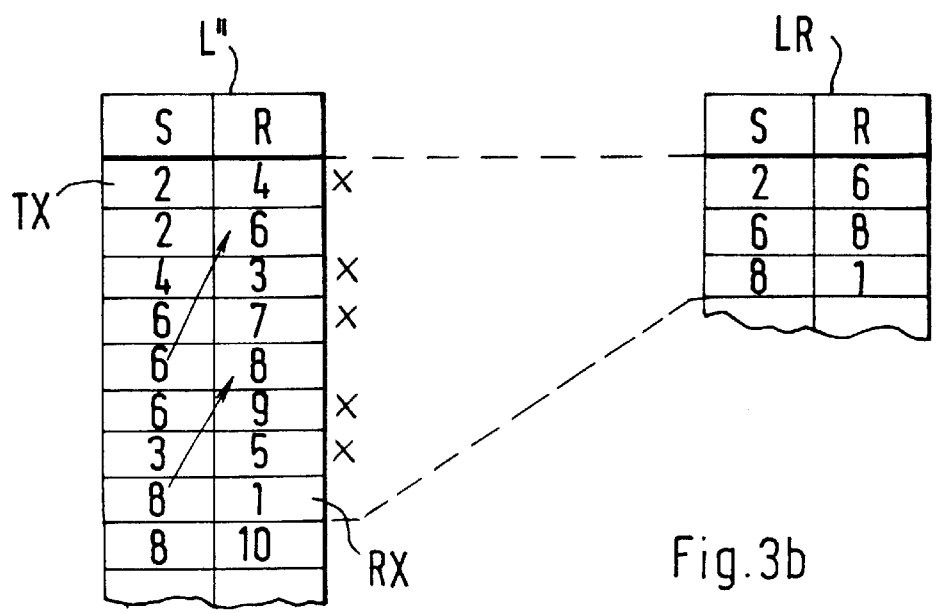

One embodiment of the invention will now be described with reference to the accompanying schematic drawings, in which:

FIG. 1 is a flowchart showing the steps of the method;

FIG. 2*a* shows the structure of a decentralized radiocommunications network;

FIG. 2*b* shows a radio chain from a calling station to a called station;

FIG. 3*a* shows the step-by-step extension of a list for the calling station; and FIG. 3*b* shows the formation of a shortened list.

FIGS. 1 to 3 relate to the same embodiment of the invention. Therefore, similar reference characters refer to similar elements in each of the figures.

FIG. 1 shows the flowchart for a method 100 of establishing a radio chain. It is assumed that a memory in each radio station holds the information on all existing radio links, as is described, for example, in the prior art referred to above. The method comprises creating a list L for the calling station and subsequently extending this list into a list L". Finally, a shortened list LR is formed from the extended list L".

After the start of the process, in a first step 110, a list L is created which has N rows (N is a natural number) and two columns S and R. The number of rows N is not fixed, but each list is extended row by row by entering information on radio links as follows: The identification of the sending station is entered in column S, and the identification of the receiving station in entered in column R. At the beginning of the process, the row number N and a generation counter i are set to zero. The list is continued only up to that row N which contains the information on that radio link which ends at the called station. First, direct radio links to the neighboring stations are entered for i= and then the other radio links are taken into account for i>0, with the generation counter i indicating which rank each of the radio links occupies in the radio chain. In other words: Those radio links which originate from the calling station (here S=2) and terminate at the neighboring stations (here R=4 and R=6) are assigned to the parent generation (i=0). Those radio links which originate from these neighboring stations (4 and 6) and terminate at stations adjacent thereto (3; 8, 7, and 9) are assigned to the first generation (i=1). Those links which originate from these adjacent stations (3; 8, 7, and 9) are assigned to the second generation (i=2). The same applies analogously for the radio links of the next generations (i=i+1). Accordingly, the radio links are assigned to the different generations according to their ranks in the radio chain.

The list L begins with entries for the parent generation (i=0): In a step 120, N is increased by 1 (N=N+1). In the first row N=1, the identification of the sending station is entered in column S (S=2, see also FIG. 3a). In a next step 130, a check is made to see whether there is a station which is receiving from the sending station, i.e., whether there is a radio link from the calling station (S=2) to a receiving station. If that is not the case, the process will be terminated. If that is the case, the entry in row N=1 will be completed in a further step 140 by entering the identification of the receiving station (here R=4, see also FIG. 3a) in column R. By this information in each row, existing radio links in the radiocommunications network are uniquely identified.

In this example for row N=1, a radio link exists from the sending station 2 to the receiving station 4. After the identification of the receiving station has been entered in the row, in a further step 151, a check is made to determine whether this receiving station is the called station (R=1), hereinafter also to referred to as "the destination station".

If that is the case, the extension of the list is complete and the list will be shortened in a step 170. After the formation of the shortened list LR, which will be described below with the aid of FIG. 3b, the process is terminated. If the station is not the destination station (R≠1), in a further step 152, a check is made to see whether for the sending station (S=2), there is a further receiving station within the same generation (here i=0 and R=6). If that is the case, in a further step 160, the row number will be increased by 1 and the identification of the further receiving station (R=6) will be entered in row N=N+1. Step 151 is then repeated, i.e., repeated checks are made to see whether this receiving station is the desired destination station.

If the check in step 152 indicates that there is no further receiving station, in a step 153, the list L'will be extended by adding the next generation (i=i+1), and a check is made to determine whether the receiving station has already been entered in any row in column R. If that is the case, no (repeated) entry will be made in the list. As explained above, the function of the generation counter i is to view all radio links of equal rank together. After the radio links for the parent generation (i=0) and for the first generation (i=1) were entered in lists L and L', respectively, all radio links for the second generation (i=2) are now determined and entered in list L" (here S=3 and 8; R=5 and 1, respectively).

The list is extended row by row and continuously from one generation to the next as described above until a radio link is found which terminates at the called station (here station 1).

The establishment of a radio chain by the method illustrated in FIG. 1 will now be further described with the aid of FIGS. 2 and 3. FIG. 2a shows a radiocommunications network N with 10 radio stations 1 to 10. The radiocommunications network is a decentralized network with mobile stations. FIG. 2a schematically shows a situation in which the following radio links exist: From station 2, radio links exist to station 4 and station 6. These radio links belong to the parent generation (i=0). From these neighboring stations 4 and 6, the following radio links, which belong to the first generation (i=1), exist to neighboring stations: from station 6 to stations 7, 8, and 9, and from station 4 to station 3. From the receiving stations 3, 7, and 8, the following radio links of the second generation (i=2) exist to neighboring stations: from station 3 to station 5, and from station 8 to stations 7 and 1. In the second generation (i=2), station 7 is not entered in the list, since this station was already entered in the first generation (i=1). The radio links of the third generation (i=3) originate from stations 5, 7, 1, and 10 and are the following: from 5 to 7, and from 1 to 4, 5, and 9. No radio links originate from stations 7 and 10.

By the method described in the foregoing, it is possible to form a radio chain which originates from the calling station 2 and terminates at the called station 1. A possible radio chain is shown in FIG. 2b and contains the following radio links: from the calling station TX=2 to station 6, then to station 8, and finally to the called station RX=1. This radio chain RC is only one of several possible radio chains. Another ratio chain could be formed from the following radio links: from 2 to 4, from 4 to 3, from 3 to 5, and from 5 to 1.

The radio chain RC shown in FIG. 2b is the shortest of all possible radio chains in the radiocommunications network. For the shortest radio chain, a list LR was formed from the extended list by the method 100 of FIG. 1. The extension and the shortening of the list are illustrated in more detail in FIG. 3.

FIG. 3a illustrates the extension of the list for the calling station TX=2. The list L, which contains the radio links to the neighboring stations 4 and 6, is extended by entering the radio links of the first generation, thus forming a list L'. Then, this list L 'is, in turn, extended by adding information on radio links of the second generation. This extended list L"already contains a radio link which terminates at the called station TX=1, namely the radio link S=8 and R=1. Hence, the extension of list L" is terminated at this point.

FIG. 3b shows how the shortened LR is formed from the extended list L". The extended list L" contains all information that could be required to establish a radio chain from station 2 to station 1. All rows with information which is not needed for the establishment of the shortest radio chain are now deleted from list L".

To do this, starting from the destination station R=1, i.e., from column R, last row, of list L", the sending station S=8 is searched for and located in column S. Then, this station 8 is searched for in the preceding rows in column R. In the example of FIG. 3b, this entry R=8 is found in the fifth row. Then, the associated entry in column S is searched for, here: S=6. Thus, the last two links of the radio chain have already been found, namely the radio link from 6 to 8 and the radio link from 8 to 1. Next, the entry R=6 is searched for in the preceding rows. This entry is contained in the second row together with the entry S=2. Thus, a further link (S=2 and R=6) of the radio chain has been found, which, in this example, is also the first and still missing link that forms the radio chain together with the two other links (S=6, R=8; S=8, R=1).

Finally, those rows (here rows N=2, 5, and 8) which contain the information for the radio chain are combined into a shortened list LR.

The method described is especially suited for establishing extremely short radio links in a decentralized radiocommunications network, such as a wireless office communications network. The radiocommunications network can also be a common-frequency network in which the radio resources are accessed by TDMA or CDMA.

What is claimed is:

1. A method (100) of establishing a radio chain (RC), consisting of at least two radio links, between a calling radio station (2) and a called radio station (1) in a radiocommunications network (RN), each radio link consisting of two radio stations, the radio chain consisting of an ordered sequence of radio links in which each radio link in a pair of consecutive radio links in the ordered sequence includes one common radio station, the method comprising first steps (110 to 140) in which a list (L) is created for the calling radio station (2) when a call is to be placed from the calling station to the called station, the list containing information (S=2, R=4; 6) on radio links beginning with the calling station and leading to neighboring radio stations (4, 6), characterized by further steps (151 to 160) in which the list (L, L', L") is extended generation by generation, based on information provided to the calling station by the neighboring stations and subsequent stations, the extending being performed, only one generation at a time from a previous generation to a next generation, a generation consisting of radio stations directly reachable from all stations of the preceding generation except for radio stations already indicated on the list, (L, L', L"), the extending being continued only until the called radio station (1) is entered on the list (L"), thereby ensuring that the list (L', L") as extended contains at least one radio chain (RC) having the smallest possible number of radio links required to link the calling radio station to the called radio station and contains no radio chain (RC) having a larger number of links.

2. A method (100) as claimed in claim 1, characterized in that in a subsequent step (170), a shortened list (LR) is formed from the extended list (L") by shortening the extended list (L") to that information (S=2, R=6; S=6, R=8; S=8, R=1) which specifies a shortest radio chain (RC) from the calling radio station (2) to the called radio station (1), wherein the shortened list (LR) is formed by tracing link by link in the extended list (L'; L") backward from the called radio station (1) to the calling radio station (2) and including in the shortened list only each link determined by the backward tracing.

3. A method (100) as claimed in claim 1, characterized in that the list (L) contains a first column (S) and a second column (R), and that the information on the radio links is entered in the list (L) row by row, with information on the sending radio station (S=2) being entered in the first column (S) and information on the receiving radio station (R=3) being entered in the second column (R).

4. A method (100) as claimed in claim 2, characterized in that the information includes identifications which are assigned to the radio stations (1 to 10).

5. A radiocommunications network (RN) comprising a number of radio stations (1 to 10), including a calling radio station and a called radio station, wherein, to establish a radio chain (RC) consisting of at least two radio links to the called radio station (3), wherein each radio link consists of two radio stations and the radio chain consists of an ordered sequence of radio links in which each radio link in a pair of consecutive radio links in the ordered sequence includes one common radio station, the calling radio station (2) accesses a memory which holds a list (L) for the calling radio station (2) created when the call is to be placed from the calling station to the called station containing information (S=2, R=4; 6) on radio links to neighboring radio stations (4, 6), characterized in that the memory also contains information (S=6, R=7; 8; 9) on radio links to radio stations (7; 8; 9) adjacent to the neighboring radio stations (6), by addition of which information the list (L, L', L") is extended generation by generation, from the calling station based on information provided to the calling station by the neighboring stations and subsequent stations, the extending being performed, only one generation at a time from a previous generation to a next generation, a generation consisting of radio stations directly reached from all stations of the preceding generation except for radio stations links already indicated on the list (L, L', L"), the extending being continued only until the called radio station (1) is entered on the list (L"), thereby ensuring that the list (L', L") as extended contains at least one radio chain (RC) having the smallest possible number of radio links required to link the calling radio station to the called radio station and contains no radio chain (RC) having a larger number of links.

6. A radiocommunications network (RN) as claimed in claim 5, characterized in that the radiocommunications network is a decentralized wireless network (RN), and that the radio stations (1 to 10) exchange the information contained in the lists.

7. A radio station (2) wherein, in order to establish a radio chain (RC) consisting of at least two radio links to a called radio station (1) from a calling station, each radio link consisting of two radio stations, accesses a memory which holds a list (L) created when the call is to be placed from the calling station to the called station containing information (S=2, R=4; 6) on radio links to neighboring radio stations (4, 6), characterized in that the memory also contains information (S=6, R=7; 8; 9) on radio links to radio stations (7; 8; 9) adjacent to the neighboring radio stations (6), by addition of which information the list (L, L', L") is extended generation by generation based on information provided to the calling station by the neighboring stations and subsequent stations, the extending being performed, only one generation at a time from a previous generation to a next generation, a generation consisting of radio stations directly reacheable from all stations of the preceding generation except for radio stations already indicated on the list (L, L', L") the extending being continued only until the called radio station (1) is entered on the list, thereby ensuring that the list (L', L") as extended contains at least one radio chain (RC) having the smallest possible number of radio links required to link the radio station to the called radio station and contains no radio chain (RC) having a larger number of links, wherein the radio chain consists of an ordered sequence of radio links in which each radio link in a pair of consecutive radio links in the ordered sequence includes one common radio station.

8. A method (100) as claimed in claim 1, characterized in that the information includes identifications which are assigned to the radio stations (1 to 10).

9. A method (100) of establishing a radio chain (RC), consisting of at least two radio links, between a calling radio station (2) and a called radio station (1) in a radiocommunications network (RN), each radio link consisting of two radio stations, the radio chain consisting of an ordered sequence of radio links beginning with the calling station in which each radio link in a pair of consecutive radio links in the ordered sequence includes one common radio station, the method comprising the steps of:

a) having the calling station (2) create a list (L) containing information (S=2, R=4; 6) on radio links to neighboring radio stations (4, 6);

b) having the calling station extend the list (L) generation by generation, based on information the calling station (L) receives from the neighboring radio stations (4, 6), to create an extended list (L', L") bases on information provided to the calling station by the neighboring stations and subsequent stations, the extending being from a previous generation to a next generation, a generation consisting of radio stations directly reachable from all stations of the preceding generation except for radio stations already indicated on the list (L, L', L"), the extending being only until the called radio station (1) is entered on the list (L, L', L"), thereby ensuring that the list (L', L") as extended contains at least one radio chain (RC) having the smallest possible number of radio links required to link the calling radio station to the called radio station and contains no radio chain (RC) having a larger number of links; and c) having the calling station (L) create from the extended list (L") a shortened list (LR) by shortening the extended list (L") to the information (S=2, R=6; S=6, R=8; S=8, R=1) that specifies a shortest radio chain (RC) from the calling radio station (2) to the called radio station (1), wherein the shortened list (LR) is created by tracing link by link in the extended list (L") backward from the called radio station (1) to the calling radio station (2) and including in the shortened list only each link determined by the backward tracing.

* * * * *

UNITED STATES PATENT AND TRADEMARK OFFICE
CERTIFICATE OF CORRECTION

PATENT NO.    : 6,304,745 B1
DATED         : October 16, 2001
INVENTOR(S)   : Egon Monch It is certified that error appears in the above-identified patent and that said Letters Patent is hereby corrected as shown below:

Column 6,
Line 30, "reached" should be -- reachable --
Line 31, "links" should be deleted
Line 61, "after "(L,L',L")" -- , -- should be inserted Column 7,
Line 22, "bases" should be -- based --
Line 24, after "being" -- performed only one generation at a time -- should be inserted Column 8,
Line 5, after "being" -- continued -- should be inserted Signed and Sealed this Thirtieth Day of July, 2002

*Attest:*

JAMES E. ROGAN
*Attesting Officer*         *Director of the United States Patent and Trademark Office*